Patented Dec. 11, 1923.

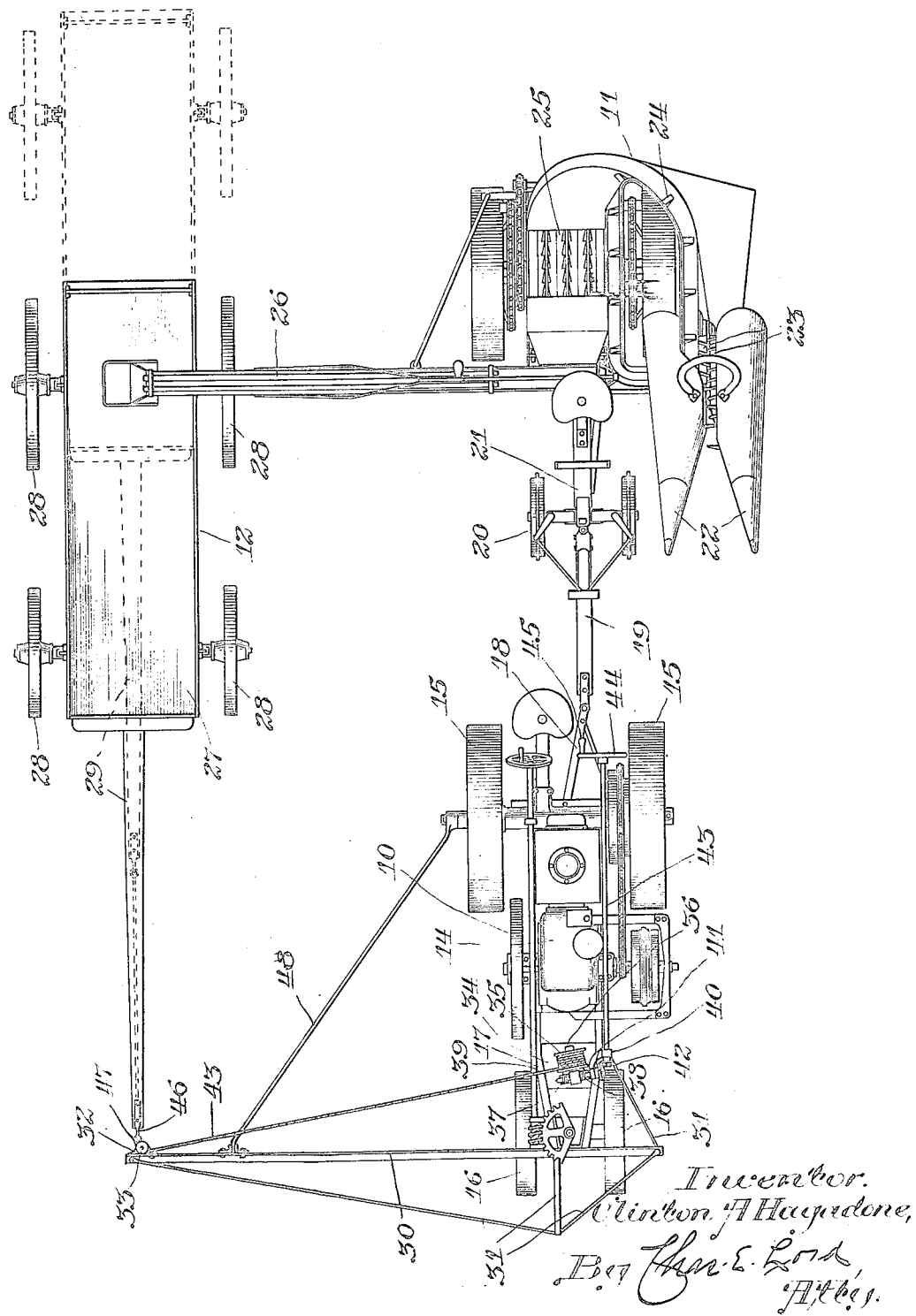

1,477,345

UNITED STATES PATENT OFFICE

CLINTON A. HAGADONE, OF WESTERN SPRINGS, ILLINOIS, ASSIGNOR TO INTERNATIONAL HARVESTER COMPANY, A CORPORATION OF NEW JERSEY.

TRACTOR HITCH FOR WAGONS.

Application filed March 1, 1919. Serial No. 280,148.

*To all whom it may concern:*

Be it known that I, CLINTON A. HAGADONE, a citizen of the United States, residing at Western Springs, in the county of Cook and State of Illinois, have invented certain new and useful Improvements in Tractor Hitches for Wagons, of which the following is a full, clear, and exact specification.

This invention relates to vehicle or wagon hitches, and more particularly to means whereby a wagon may be adjustably connected to a power propelled vehicle or truck.

It is common in these days to draw or propel harvesters of the various types through the fields by means of tractors, and when these harvesters deliver the material acted upon to a receptacle or wagon it is necessary to draw or propel this wagon through the field in a position to receive the material delivered. It is advisable under these circumstances to distribute the material evenly in the receptacle, and the present invention has for its object to provide adjustable draft connections between the tractor or truck which propels or draws the harvester and the wagon which receives the material acted upon by the harvester, whereby the material may be evenly distributed in the wagon box.

In the drawing accompanying this application I have illustrated one embodiment of my invention, there being illustrated in this embodiment a tractor 10, harvester 11, (which in this instance consists of a corn picker and husker), a wagon 12, and a draft connecting member 13 which adjustably connects the wagon to the frame of the tractor. The tractor 10 may be of any standard construction, and that illustrated comprises an engine 14, traction wheels 15, and steering wheels 16 carried by the frame 17. The tractor is provided at the rear thereof with a draft member 18, which is connected by means of a draw bar 19 to a tongue truck 20, the tongue truck being in turn connected to the stub tongue 21 of the corn picker 11.

It should be understood that in illustrating the corn picker I do not intend to be limited in any way to this type of harvester, and that any of the other well known types, such as grain binders, headers, corn binders, or other similar machines, may be substituted in place of the corn picker.

The picker illustrated comprises gathering fingers 22, snapping rolls 23, and an ear conveyer 24 which conveys the ears to the husking mechanism 25 by means of which the husks are removed from the ears, the husked ears being delivered by means of a conveyer 26 to the wagon 12. The wagon 12 comprises a wagon box 27 supported by means of wheels 28, and having a forwardly extending tongue 29.

The following mechanism is provided for adjustably connecting the tongue 29 of the wagon to the tractor 10: A frame 30 is secured to the front end of the tractor frame 17 in any suitable manner, and is provided with braces 31 to insure the rigidity of the structure. The member 30 carries at its outer end a bracket 32, in which is pivoted a sheave or pulley 33. A transverse frame member or platform 34, mounted between the side frame members of the tractor, supports a rotatably mounted drum 35 carried on a shaft 36. There is also rigidly secured to the shaft 36 a worm wheel 37, which is actuated by worm 38 carried by a jack shaft 39, mounted within a bracket 40 suitably supported on the machine frame. The shaft 39 carries at its opposite end a bevel gear 41, which meshes with a bevel gear 42 carried by a shaft 43 which is rotatably supported on the frame of the tractor and extends longitudinally thereof. The rear end of the shaft 43 has secured thereto a hand wheel 44, which is operated by means of a handle 45. The front end of the pole 29 is provided with a ring or looped member 46 to which is connected a ring 47 secured to one end of the flexible draft connecting member 13. The opposite end of this flexible member 13 is secured to the drum 35, and by means of this drum and the operating mechanism for turning the drum the flexible member may be wound upon the drum or unwound therefrom at the will of the tractor operator. A diagonal brace member 48 may be pivotally connected to the main axle of the tractor and to the member 30 for the purpose of bracing this member and strengthening the construction.

The operation of the device should be clear from the above description, but a brief statement will be given below.

As the harvester is being drawn through the field by means of the tractor, the material acted on by the harvester will be continuously delivered through the conveyer 26, and will be received by the wagon or receptacle 12. Assuming that the tractor, harvester and wagon are positioned as shown in full lines in the drawing, the material acted upon by the harvester will be deposited first at the rear end of the wagon. When this part of the wagon has been sufficiently filled, the tractor operator by turning the hand wheel 44 may allow the wagon to move rearwardly with respect to the harvester, thereby providing a fresh surface to receive the material delivered by the harvester. This operation may be continued as many times as it is found desirable, and the wagon may be moved forwardly or backwardly, as desired, in order to evenly distribute the load thereon.

While I have, in the above specification, described one embodiment of my invention, it should be distinctly understood that the invention is capable of modifications, and that I desire to be in no way limited to the types of tractor, harvester or receptacle shown in the drawings, but that various modifications may be made and other types of machines be employed without departing from the spirit and scope of the invention as expressed in the following claims.

Claims:

1. In combination, a tractor, a gathering device having delivery means, a receiving device, means connecting the tractor to the gathering device and receiving device whereby the receiving device is adapted to receive material from the delivery means, and means operable by the operator on the tractor to adjust the fore and aft position of the receiving device relative to the gathering device.

2. In combination, a tractor, a laterally extending frame member connected to the tractor, a gathering device and a receiving device, draft connections connecting the tractor and frame member to the respective devices, and means operable by the operator on the tractor to adjust the draft connection from the frame member to the receiving device to vary the fore and aft position of the receiving device.

3. In combination, a tractor, a frame member secured thereto and extending laterally therefrom, a sheave carried at the outer end of said frame member, a vehicle, a flexible connecting member between said vehicle and said tractor extending around said sheave, and means carried by said tractor for adjusting said flexible connection.

4. In combination, a tractor, a rotatable drum carried thereby, a laterally extending frame member secured to said tractor, a sheave carried by said laterally extending frame member, a vehicle, flexible means secured to said drum and passing around said sheave for connecting said vehicle to said tractor, and means for rotating said drum.

5. In combination, a tractor, a harvester propelled thereby and having a conveyer, a laterally extending draft member carried by the tractor, a receptacle connected to the draft member and adapted to receive material from the conveyer, and adjusting means operable by the operator on the tractor whereby the position of the receptacle with respect to the conveyer may be adjusted during the operation of the tractor.

6. In combination, a tractor, a harvester propelled thereby and having delivery means, a receptacle for receiving material from the delivery means, means for propelling the receptacle from the tractor, and means on the tractor operable by the operator of the tractor for adjusting the position of the receptacle with respect to the delivery means while the tractor is in motion.

7. In combination, a tractor, a laterally extending frame member carried by the tractor, two wheeled devices, means connecting one of said devices to travel substantially in the rear of the tractor, flexible means connecting the other device to the outer end of the frame member to travel a path substantially parallel to the path of the first device, and means on the tractor for adjusting the length of the flexible means to alter the fore and aft relation of the devices.

8. In combination, a tractor, a laterally projecting frame member thereon, a rotatable drum on the tractor, a sheave on the outer end of the frame member, a wheeled device, a flexible draft member connected to the device and passing over the sheave and drum, and means for rotating the drum whereby the distance between the frame member and device may be adjusted.

In testimony whereof I affix my signature.

CLINTON A. HAGADONE.